United States Patent [19]
Gasc

[11] 4,321,856
[45] Mar. 30, 1982

[54] DIAPHRAGM PULSER

[75] Inventor: Henri Gasc, Carpentras, France

[73] Assignee: Commissariat a l'Energie Atomique, Paris, France

[21] Appl. No.: 110,195

[22] Filed: Jan. 7, 1980

[30] Foreign Application Priority Data

Jan. 9, 1979 [FR] France ............... 79 00407

[51] Int. Cl.³ ............................................. F01B 19/00
[52] U.S. Cl. ................................... 92/48; 92/83; 92/86.5; 92/98 R
[58] Field of Search ............... 92/45, 48, 83, 97, 105, 92/98 R, 39, 38, 86.5, 1, 92; 60/586, 587, 592

[56] References Cited
U.S. PATENT DOCUMENTS 2,208,772  7/1940  Morley ................................ 92/97
2,811,925  11/1957  Crooksten ........................... 92/92
3,204,858  9/1965  Dros .................................... 60/592
3,314,594  4/1967  Rietdijk .............................. 92/48

Primary Examiner—Abraham Hershkovitz
Attorney, Agent, or Firm—Kerkam, Stowell, Kondracki & Clarke

[57] ABSTRACT

In a pulser for transmitting the reciprocating motion of a piston to a fluid contained in a chamber such as a solvent extraction column, at least one pulsation diaphragm having the shape of a hollow torus is joined to the piston and to a rim of the duct in leak-tight manner, means being provided for applying a pressure which compensates for the static pressure of the fluid on the piston and the pulsation diaphragm. The difference between the pressure exerted on the internal wall of the diaphragm on the fluid side and the pressure exerted on the external diaphragm wall is minimized during operation but maintained at a positive value.

2 Claims, 5 Drawing Figures

DIAPHRAGM PULSER

This invention relates to diaphragm pulsers and especially to the pulsers employed for imparting reciprocating motion to fluids.

Pulsers of this type are more particularly applicable to the petrochemical industry, the pharmaceutical industry, hydrometallurgy and so forth, in which solvent separation columns are employed.

It is known that, in order to accelerate certain physical or chemical reactions which take place within columns loaded with liquid, said liquid has to be subjected to reciprocating or pulsating motion of small amplitude at a frequency in the vicinity of one cycle per second. As a general rule, reciprocating fluid motion is produced by a pulser constituted by a piston, the piston being caused to reciprocate in an auxiliary chamber which is connected by means of a duct to the bottom of a column loaded with liquids. It is readily apparent that said piston is displaced by suitable means and that this displacement serves to deform a diaphragm and therefore to subject said liquid to alternating pressure variations. The pulsers employed are usually isolated from the corrosive medium constituted by the liquid phases contained in the columns. Since they are intended to transmit the reciprocating motion of a piston, this transmission being effected by means of a buffer fluid located between the piston and a diaphragm which provides a separation between the piston and the liquid phases. The internal space located between the piston and the diaphragm which forms a separation between said piston and the column is filled with oil, the function of which is essentially to transmit the reciprocating motion to the liquids contained in said column. In order to reduce the energy which is necessary for the reciprocating motion of the piston, the static pressure exerted on the piston by the height of liquid of the column is compensated by a back-pressure exerted on the piston by means of a volume of oil connected to a pressurized tank.

The main defect of this type of pulser arises from the fact that it proves impossible to achieve perfect leak-tightness between the cylinder and the piston. In consequence, the volume of oil between the piston and the separation diaphragm is not strictly constant; as a result of this variation in volume, deformation of the separation diaphragm is irregular and its effectiveness is readily impaired. In order to overcome this disadvantage, the maximum range of displacement of the diaphragm is limited by two rigid support grids located on each side of said diaphragm and pierced by small openings for the flow of the liquid contained within the internal space located between the piston and the separation diaphragm. When the piston operates, the diaphragm is applied against the support grids at each stroke of the piston, thus limiting its deformation and protecting said diaphragm against any potential danger of failure. In spite of this improvement, leakage between the piston and the cylinder is continuous and the volume of oil contained between the separation diaphragm and the piston varies continuously. In consequence, the diaphragm is subjected to an asymmetrical movement, the amplitude of which decreases in the course of time. In order to overcome this drawback, the pulser is associated with a leakage compensation device which restores the initial volume within the chamber above the piston as soon as the diaphragm comes into contact with the support grids. In spite of all these improvements, the presence of two perforated support grids is objectionable since these latter cause additional pressure drops which make it necessary to increase the power to be supplied to the pulser.

The aim of the present invention is to overcome these disadvantages and especially to provide a diaphragm pulser in which the static pressure produced by the liquid on the piston is counterbalanced by very simple compensating means. In the event that the liquids to be processed in the column or the chamber are corrosive, the invention also makes it possible to dispense with the grids for supporting the separation diaphragm located between the piston and the chamber. In the pulser according to the invention, the volume between the piston and the separation diaphragm is in fact constant. When the liquids to be processed are not corrosive, the separation diaphragm itself can be dispensed with. All these aims are achieved by making use of a pulsation diaphragm of toric shape which is connected to the piston and to the chamber and is capable of withstanding pressure differences of several bar units. In the event that the liquids to be processed are corrosive, said toric diaphragm can be protected internally by a corrosion-resistant coating, thus making it possible to dispense with the separation diaphragm between the piston and the chamber.

The invention is directed to a pulser for transmitting the reciprocating motion of a piston to a fluid contained in a chamber via a duct which opens into said chamber. Said pulser essentially comprises at least one pulsation diaphragm which is joined to the piston and to a rim of the duct in leak-tight manner, means for applying a pressure which compensates for the static pressure of the fluid on the piston and within the pulsation diaphragm, means whereby the difference between the pressure exerted on the internal wall of the pulsation diaphragm on the fluid side and the pressure exerted on the external wall of said diaphragm is minimized during operation of the pulser but maintained at a positive value. The pulsation diaphragm has the shape of a hollow torus cut by a cylinder, the axis of which corresponds to that of the torus and the diameter of which is larger than the internal diameter of the torus while being smaller than or equal to the mean diameter of said torus; in consequence, one of the edges of the cut hollow torus is joined to said duct rim in leak-tight manner whilst the other edge of said cut torus is joined to the piston in leak-tight manner.

According to another distinctive feature of the invention, the compensation diaphragm comprises a flexible reinforcement which permits deformation of said diaphragm without modifying the area of its envelope.

According to yet another distinctive feature, the static pressure compensation means comprise at least one pressure compensation diaphragm having the same shape and the same structure as the pulsation diaphragm and joined in leak-tight manner to the piston and to another rim of the duct on the opposite side of the pulsation diaphragm with respect to the piston, means for pressurizing the internal space delimited on the one hand by the duct at the end remote from the location at which said duct opens into the chamber and on the other hand by the piston and by the interior of the compensation diaphragm, and means whereby the difference between the pressure exerted within the compensation diaphragm and the pressure prevailing externally of said diaphragm is minimized during operation but remains at a positive value.

According to still another particular feature, the means for minimizing the pressure difference between the interior and exterior of the pulsation diaphragm and the pressure difference between the interior and the exterior of the compensation diaphragm are constituted by a single pressurization enclosure which surrounds the two diaphragms.

According to a further distinctive feature, the single enclosure is connected to means for producing within said enclosure a pressure which is lower than or equal to the lowest pressure generated by the fluid within the pulsation diaphragm when the pulser is in operation.

According to yet a further distinctive feature, the means for pressurizing said internal space delimited by the duct, the piston and the interior of the compensation diaphragm are connected to means for producing within said internal space a pressure equivalent to the static pressure produced by the fluid on the pulsation diaphragm.

According to still a further distinctive feature of the invention, the static pressure compensation means comprise at least one jack connected to pressurization means for exerting beneath the piston a thrust equal to the static pressure of the fluid on the piston and within the pulsation diaphragm.

According to a particular feature in the case of utilization of jacks, the means for minimizing the pressure difference between the interior and the exterior of the pulsation diaphragm are constituted by a pressurization enclosure which surrounds the pulsation diaphragm.

According to another distinctive feature, said pressurization enclosure is connected to means for producing within said enclosure a pressure which is lower than or equal to the lowest pressure produced by the fluid on the pulsation diaphragm when the pulser is in operation.

According to yet another distinctive feature, the pulser comprises a plurality of said pulsation diaphragms in superposed relation, one of the edges of the cut hollow torus forming the first diaphragm of said plurality being joined to the duct in leak-tight manner whilst another edge of the cut hollow torus forming the last diaphragm of said plurality is joined to the piston in leak-tight manner, the opposite edges of the diaphragms of said plurality being connected in leak-tight manner.

According to again another distinctive feature, the pulser comprises a plurality of said compensation diaphragms in superposed relation, one of the edges of the cut hollow torus forming the first diaphragm of said plurality being joined to said duct rim in leak-tight manner whilst another edge of the cut hollow torus forming the last diaphragm of said plurality is joined to the piston in leak-tight manner.

According to still another distinctive feature, the movement of the piston is controlled by means for driving said piston in linear reciprocating motion. Said means can be constituted by a crank and crankpin system comprising at least two cranks disposed symmetrically with respect to the axis of the piston and driven in synchronism by two crankpins which rotate in opposite directions.

According to an advantageous feature, the flexible reinforcements of the pulsation or compensation diaphragms are constituted by tire reinforcements of motor vehicles or trucks.

According to a further distinctive feature, a separation diaphragm is interposed between the fluid and the pulsation diaphragm at the location in which the duct opens into the chamber in the event that the fluid is corrosive. The internal duct space formed between the pulsation diaphragm and the separation diaphragm which is joined to the piston is filled with an incompressible fluid. Said separation diaphragm can be constituted by a flexible support of elastomer coated with a film of tetrafluoroethylene.

Further distinctive features and advantages of the invention will become apparent from the following description which is given with reference to the accompanying drawings, wherein.

Figure 1:
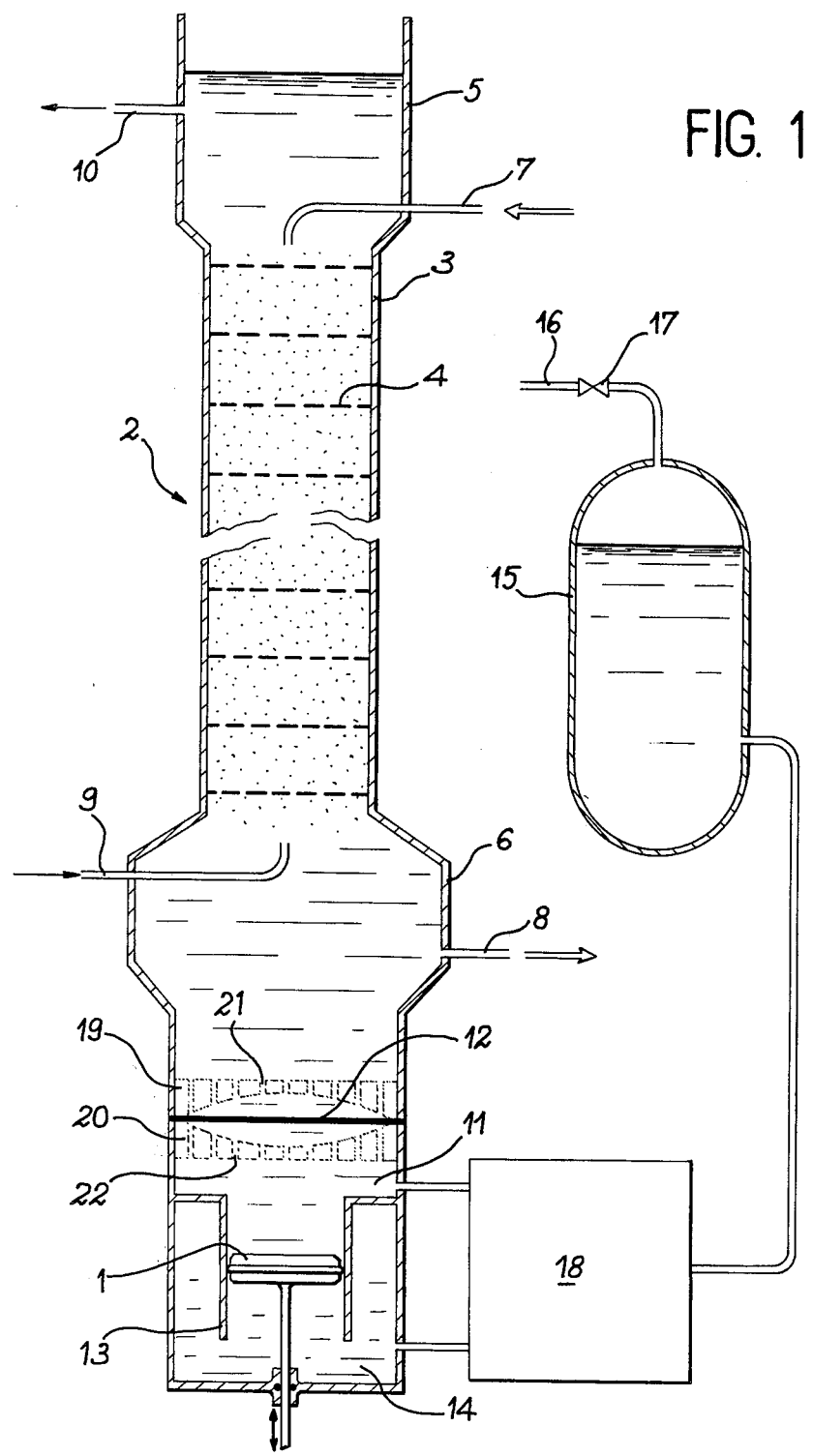
FIG. 1 is a schematic illustration of a pulser which is already known in the present state of the art and is intended to transmit the reciprocating motion of a piston to a chamber or to a column containing liquids.

Referring to the schematic illustration of FIG. 1, there is shown a pulser of known type currently employed in the present state of the technique for transmitting the reciprocating motion of a piston 1 to a chamber or to a liquid column 2. Said column can be employed in hydrometallurgy in which the methods of solvent extraction are coming into increasingly widespread use for the separation of two metals, for example, or for the fabrication of metals having very high purity such as zirconium. Columns of this type can also be employed in the petrochemical industry for processing effluents by means of a method of separation in liquid phases. The column 2 has a tubular and vertical central portion 3 in which are fixed perforated plates 4 in uniformly spaced relation. The end portions 5, 6 are not provided with plates and usually have a larger cross-sectional area than the central zone 3 of said column but are of smaller height. When said column serves to process effluents, an inlet 7 is provided at the top of the column for the heavy liquid phase and an outlet 8 is provided for said phase at the bottom of the column. An inlet 9 for admission of the light liquid phase is provided at the bottom whereas an outlet 10 for the light phase is provided at the top of the column. The two liquids flow countercurrentwise within the column under the action of their difference in density. A pulsation device known as a pulser produces reciprocating motion of all the liquids contained within the column. In the central zone of the column, said motion causes dispersion of one phase within the other and ensures high efficiency.

As a general rule, the pulsers employed are isolated from the corrosive medium constituted by the liquid phases to which their motion has to be transmitted. In consequence, the reciprocating motion of the pulser is transmitted by means of a buffer fluid 11 contained above the piston 1 and separated from the column by a separation diaphragm 12 which affords resistance to chemical attack.

Said pulser further comprises a cylinder 13 in which the piston 1 is capable of displacement in reciprocating motion by means of the action of a crank and crankpin or of a hydraulic jack, for example (not shown). The liquid 11 contained above the piston usually consists of oil, the function of which is essentially to transmit the reciprocating motion of the piston to the liquids contained in the column. In order to reduce the energy which is necessary for the reciprocating motion of the piston, the static pressure exerted on the piston by the height of liquid of the column is counterbalanced by a back-pressure exerted beneath the piston by means of a volume of oil 14 connected to a pressurized drum 15 by means of a supply of compressed air 16, the pressure of which can be regulated by a valve 17. The volume of oil 14 is connected to the pressurized drum 15 by means of a leakage compensation device 18 for maintaining constant the volume of oil 11 located between the piston 1 and the separation diaphragm 12 when leakage occurs between the piston 1 and the cylinder 13.

As mentioned earlier, an important disadvantage of this type of pulser arises from the fact that it is impossible to achieve perfect leak-tightness between the cylinder and the piston. In consequence, if leakage takes place from the volume 11 to the volume 14 or conversely, the volume 11 varies, thus resulting in a displacement of the work plane and of the separation diaphragm 12, and therefore in rapid damage to said diaphragm. As has already been mentioned, one method of overcoming this disadvantage consists in limiting the maximum range of displacement of the separation diaphragm by means of two rigid support grids 19, 20 pierced by openings 21, 22; these openings provide passageways for the flow of the liquid phases contained in the column above the separation diaphragm 12 as well as the flow of oil contained in the volume 11 beneath the separation diaphragm. The profile of these support grids depends essentially on the maximum deformation to which the diaphragm can be subjected. When the volume 11 varies as a result of leakages between the piston 1 and the cylinder 13, the diaphragm is applied against one of the support grids at each piston stroke, with the result that said grids limit deformation of the diaphragm and guard against failure of this latter. Since leakage between the piston and the cylinder is continuous, the volume 11 varies continuously, with the result that the amplitude of deformation of the diaphragm is reduced and that the pulsation effect consequently becomes progressively smaller. It is in order to provide a remedy for this considerable drawback that it proves necessary to employ a leakage compensation device which restores the initial volume 11 as soon as the diaphragm comes into contact with the support grids. However, these grids have the disadvantage of inducing additional pressure drops resulting from the perforations 21, 22, thus entailing the need for an increase in the energy required for operation of the pulser.

Figure 2:
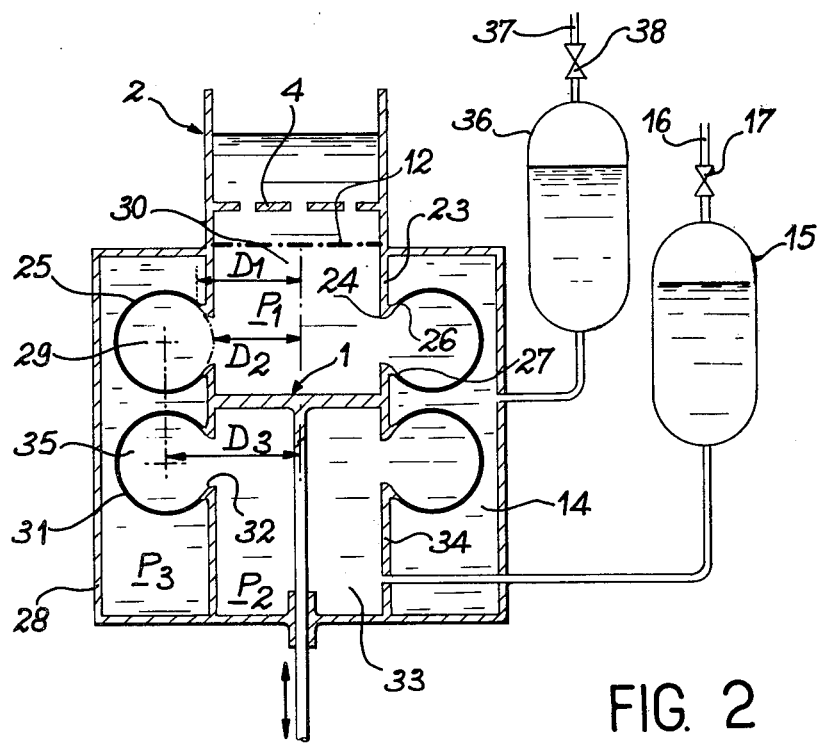
FIG. 2 is a schematic illustration of one embodiment of a pulser according to the invention in which said pulser is provided with a compensation diaphragm having the same shape as the pulsation diaphragm.

Referring now to FIG. 2, a first embodiment of a pulser according to the invention is illustrated schematically in this figure. The pulser is intended to transmit the reciprocating motion of the piston 1 to a fluid or to fluids contained in the chamber or the column 2 via the duct 23 at the bottom of said column. Said chamber or said column 2 is comparable with that shown in FIG. 1. The duct 23 does not perform the function of a cylinder for the piston 1 but the rim 24 of said duct is joined to the piston 1 in leak-tight manner by means of a pulsation diaphragm 25. Said pulsation diaphragm comprises a flexible reinforcement which permits deformation of the diaphragm without modifying the area of its envelope. The shape of said diaphragm is that of a hollow torus cut by a cylinder, the axis of which corresponds to that of the torus and the diameter $D_1$ of which is larger than the internal diameter $D_2$ of said torus while being smaller than or equal to the mean diameter $D_3$ of the torus. One of the edges 26 of said hollow torus which has been cut in this manner is joined to the rim 24 of the duct 23 in leak-tight manner whilst the other edge 27 of said hollow torus is joined to the piston 1 in leak-tight manner.

The pulser which is illustrated in FIG. 2 also comprises compensating means for balancing the static pressure of the fluid on the piston 1 and within the pulsation diaphragm 25. In this embodiment, said compensating means comprise a compensation diaphragm 31 which is joined to the piston in leak-tight manner and located opposite to the pulsation diaphragm with respect to the piston 1 and is also joined in leak-tight manner to another rim 32 of another portion 34 of the duct 23; the duct 23 is interrupted between the two diaphragms. In this embodiment, the pulser further comprises means for pressurizing the internal space 33 which is delimited on the one hand by the portion 34 of the duct 23 and on the other hand by the piston 1 and by the interior 35 of the compensation diaphragm 31; said internal space is filled with a liquid or gaseous fluid and is connected to means for subjecting said fluid to a pressure equivalent to the static pressure developed by the fluid contained in the column 2. These means are constituted in known manner by a pressurization drum 15 which is connected to a compressed air pipe 16 by means of a pressure-regulating valve 17. The compensation diaphragm 35 has the same shape and the same structure as the pulsation diaphragm 25. It is clearly apparent, however, that the size of the diaphragm could be different from the size of the diaphragm 25.

As is the case with the pulsation diaphragm 25, the compensation diaphragm 31 comprises a flexible reinforcement which permits deformation of said diaphragm without any modification of the area of its envelope. The reinforcements of the pulsation and compensation diaphragms are of the type employed in the fabrication of tires for motor vehicles or trucks.

In this embodiment, the compensation diaphragm 31 and the pulsation diaphragm 25 are associated with means for minimizing and maintaining a positive value of pressure difference $P_1 - P_3$ between the interior 29 of the pulsation diaphragm 25 and the exterior 14 of said diaphragm when the pulser is in operation. Means are also provided for minimizing and maintaining a positive value of pressure difference $P_2 - P_3$ between the interior 35 of the compensation diaphragm 31 and the exterior 14 of said diaphragm when the pulser is in operation. These means are constituted by a pressurization enclosure 28 which surrounds the pulsation and compensation diaphragms. The volume 14 of said enclosure is filled with a liquid or gaseous fluid and connected to means for subjecting the fluid contained therein to a pressure which is lower than or equal to the lowest pressure produced by the fluid of the column 2 within the pulsation diaphragm and on the piston when the pulser is actuated. By way of example, said pressurization means are constituted by a pressurization drum 36 which is connected to a compressed air pipe 37 through a pressure-regulating valve 38.

Figure 3:
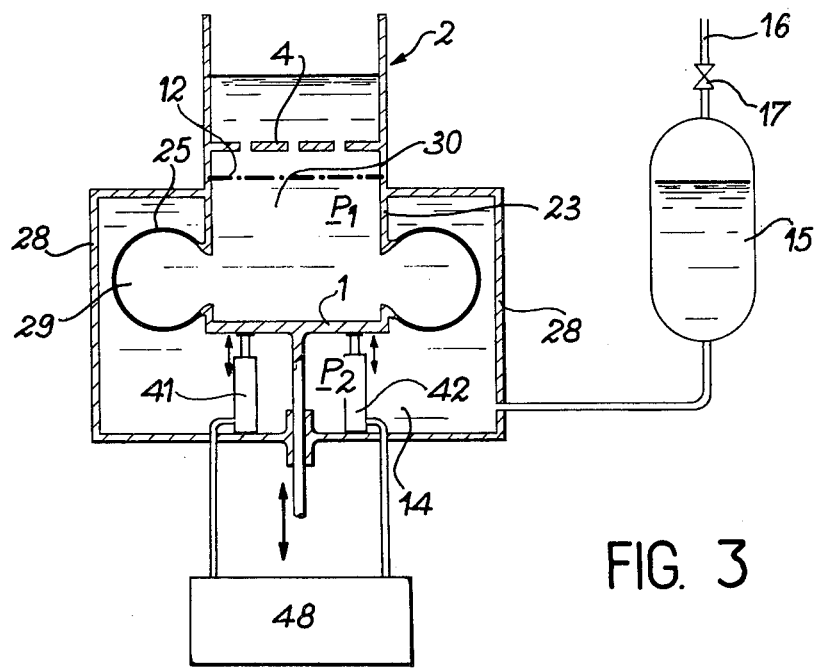
FIG. 3 is a schematic illustration of another embodiment of a pulser according to the invention, the means for balancing the static pressure of the fluid being constituted by jacks.

Referring now to FIG. 3, there is shown another embodiment of a pulser according to the invention. The same elements are designated by the same references in this figure and in FIG. 2. In this further embodiment, the pulser comprises means providing compensation for the static pressure of the fluid on the piston 1 and within the pulsation diaphragm 25. Said means providing compensation for static pressure are constituted by one or a number of jacks which apply a pressure beneath the piston. Said pressure is equal to the static pressure of the fluid of the column 2 on the piston 1 and within the internal portion 29 of the diaphragm 25. Two of these jacks 41, 42 as shown in the figure are disposed symmetrically with respect to the axis of the piston and connected to known pressurization means 48; these means make it possible for the jacks to exert beneath the piston a thrust equal to the static pressure of the fluid within the column 2.

Said pulser further comprises means for minimizing and maintaining a positive value of pressure difference $P_1 - P_2$ between the interior 29 of the diaphragm 25 and the exterior 14 of said diaphragm. Said means are constituted by a pressurization enclosure 28. Said enclosure surrounds the pulsation diaphragm 25, is filled with a liquid or gaseous fluid and is connected to means for subjecting said fluid to a pressure which is lower than or equal to the lowest pressure produced by the fluid of column 2, within the pulsation diaphragm 25 and on the piston 1 when the pulser is actuated. The means for producing said pressure are constituted, for example, by the volume of oil 14 contained within the enclosure 28 and connected to a pressurization drum 15 which is in turn pressurized by a supply 16 of compressed air, the pressure of which can be regulated by a valve 17.

Figure 4:
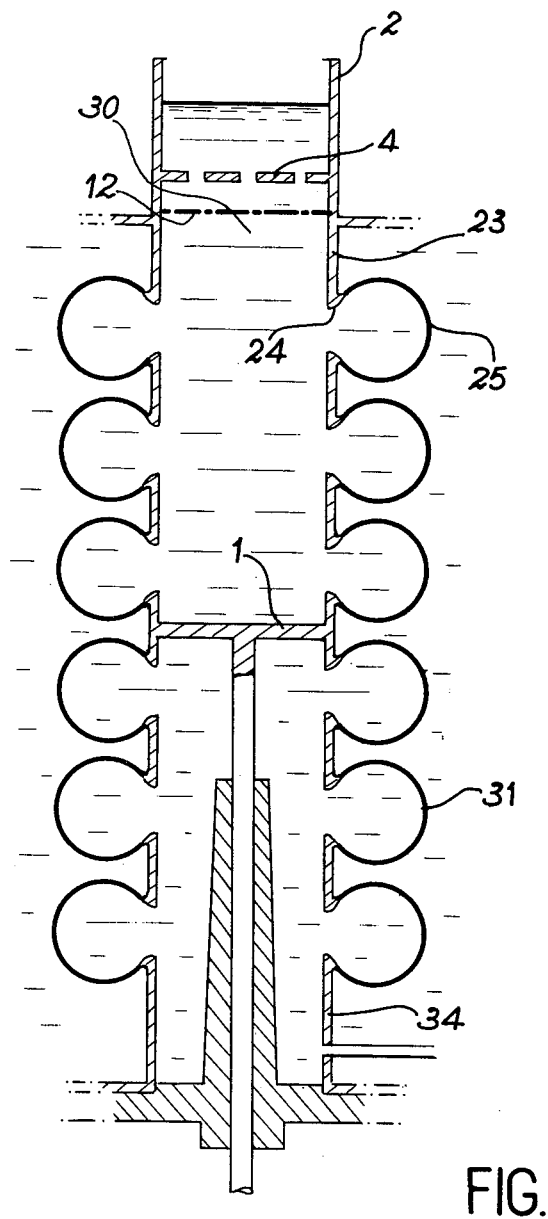
FIG. 4 illustrates another embodiment of a pulser according to the invention and comprising a plurality of pulsation diaphragms as well as a plurality of compensation diaphragms.

Reference will now be made to FIG. 4 in which another embodiment of a pulser according to the invention is illustrated schematically. This figure shows only the piston 1 and the pulsation and compensation diaphragms 25 and 31 respectively. In this embodiment, the pulser comprises a plurality of pulsation diaphragms 25 and a plurality of compensation diaphragms 31. These diaphragms are superposed so as to be joined to each other in leak-tight manner. Thus one edge of the first diaphragm of the plurality of pulsation diaphragms 25 is joined to the rim 24 of the duct 23 and one edge of the last diaphragm of said plurality of pulsation diaphragms is joined to the piston 1 in leak-tight manner. Similarly, one edge of the first diaphragm of the plurality of compensation diaphragms 31 is joined in leak-tight manner to the portion 34 of the duct 23; the other diaphragms are joined together in leak-tight manner and one edge of the last diaphragm of said plurality is joined to the piston 1 in leak-tight manner. The use of a plurality of diaphragms makes it possible to reduce the stresses applied to each of these latter. It will clearly be understood that the number of pulsation and compensation diaphragms can vary according to requirements and that the dimensions of these diaphragms can be different.

It is also readily apparent that, in the case of the pulsers shown in FIGS. 2, 3 and 4, it would have been possible to place a separation diaphragm 12 at the bottom of the column 2. Said separation diaphragm can be constituted by a flexible support of elastomer coated with a film of tetrafluoroethylene. This coating is made necessary in the event that the pulsation diaphragm 25 is not coated with an anti-corrosion film for protecting said diaphragm against the attacking action of corrosive liquids which may be present within the column 2. When a separation diaphragm is employed, the internal space 30 formed between the pulsation diaphragm 25, the top face of the piston 1 and the separation diaphragm 12 is filled with a liquid. Said internal space has a constant volume by reason of the leak-tightness achieved by the pulsation diaphragm 25 between the piston 1 and the rim 24 of the duct 23. The fact that said volume is constant is particularly important since no provision need be made at the level of the piston for any leakage compensation device. As mentioned earlier, known pulsers involving displacement of a piston within a cylinder are in fact subject to leakages which have to be compensated. When a separation diaphragm is present, the pulser according to the invention produces action at constant volume and makes it possible to transmit entirely to the diaphragm 12 the pulsation forces produced by displacement of the piston 1 and by deformation of the diaphragm 25.

The movement of the fluids within the chamber or column 2 is produced by deformation of the toric diaphragm 25 and by displacement of the piston 1 without involving any need to employ a device which provides compensation for leakages around the piston. The wall of the toric diaphragm is capable of withstanding pressure differences of several bars; moreover, when an anti-corrosion film (not shown in the figures) is applied to the internal surface of the pulsation diaphragm, it is not necessary to provide a separation diaphragm at the bottom of the column 2.

In the embodiments illustrated in FIGS. 2, 3, 4, the form of pulsation obtained is identical during both the upward and downward travel of the piston since identical efforts are exerted on the diaphragms irrespective of the direction of displacement and the energy to be supplied for displacement of the piston is reduced to a minimum.

Figure 5:
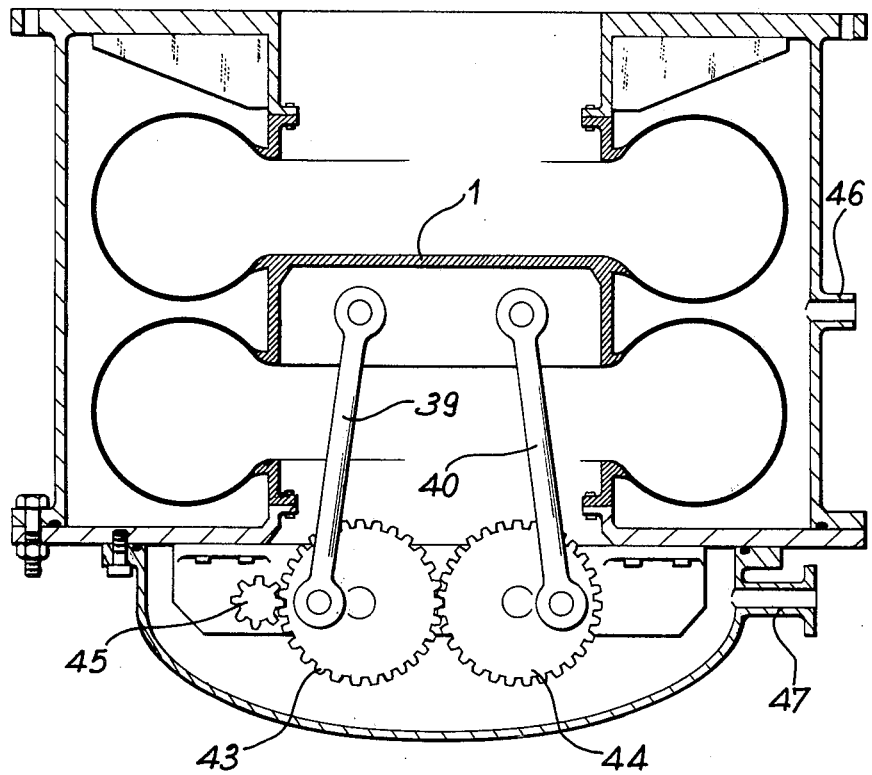
FIG. 5 is a more detailed illustration of the means employed for driving the piston in reciprocating motion.

Referring now to FIG. 5, the means for driving the piston 1 are shown in greater detail. These means serve to impart linear reciprocating motion to the piston and are constituted by a crank and crankpin system which is preferably double and symmetrical with respect to the axis of displacement of the piston. Said system comprises at least two cranks 39, 40. Said cranks and crankpins are driven in rotation in opposite directions by means of synchronizing gear-wheels 43, 44 which are in turn driven by a pinion 45. This symmetrical crank-arm linkage makes it possible to eliminate lateral reactions on the diaphragms. There are also shown in this figure the ducts 46, 47 which are connected to the pressurization drums 36 and 15 mentioned earlier.

The piston of the pulser is not provided with a guiding device. In fact, guiding of the piston along a rectilinear path is carried out by the toric diaphragms; when they are subjected to an internal pressure of higher value than the pressure prevailing externally of the torus, the diaphragms tend to occupy the largest volume permitted by the flexible but non-elastic reinforcement which forms part of said diaphragms.

In consequence, all the internal forces arising from said internal pressure are equal and normal to the wall of the torus, with the result that the axis of the torus is always perpendicular to the plane of the piston.

The reinforcements of the automobile or truck tires are toric diaphragms which correspond to the description of the invention.

It is wholly apparent that, in the different embodiments of the pulser according to the invention which have been described in the foregoing by way of example, the means employed could be replaced by equivalent means without thereby departing either from the scope or the spirit of the invention.

I claim:

1. A pulser for transmitting the reciprocating motion of a piston to a fluid contained in a chamber via a duct which opens into said chamber, wherein said pulser comprises at least one pulsation diaphragm joined to the piston and to a rim of the duct in leak-tight manner, means for applying a pressure which compensates for the static pressure of the fluid on the piston and the pulsation diaphragm, means whereby the difference between the pressure exerted on the internal wall of the diaphragm on the fluid side and the pressure exerted on the external wall of said diaphragm is minimized during operation of the pulser but maintained at a positive value, the pulsation diaphragm being given the shape of a hollow torus cut by a cylinder having an axis corresponding to that of the torus and a diameter which is larger than that internal diameter of the torus while being smaller than or equal to the mean diameter of said torus with the result that one of the edges of the cut hollow torus is joined to said duct rim in leak-tight manner whilst the other edge of said cut torus is joined to the piston in leak-tight manner, wherein said pulsation diaphragm comprises a flexible reinforcement which permits deformation of said diaphragm without modifying the area of its envelope, wherein the static pressure compensation means comprise at least one pressure compensation diaphragm having the same shape and the same structure as the pulsation diaphragm and joined in leak-tight manner to the piston and to another rim of the duct on the opposite side of the pulsation diaphragm with respect to the piston, means for pressurizing the internal space delimited on the one hand by the duct at the end remote from the location at which said duct opens into the chamber and on the other hand by the piston and by the interior of the compensation diaphragm, and means whereby the difference between the pressure exerted within the compensation diaphragm and the pressure prevailing externally of said diaphragm is minimized during operation but remains at a positive value, wherein the means for minimizing the pressure difference between the interior and exterior of the pulsation diaphragm and the pressure difference between the interior and the exterior of the compensation diaphragm are constituted by a single pressurization enclosure which surrounds the two diaphragms.

2. A pulser according to claim 1, wherein said single enclosure is connected to means for producing within said enclosure a pressure which is lower than or equal to the lowest pressure produced by the fluid on the pulsation diaphragm when the pulser is in operation.

* * * * *